May 25, 1954 P. E. KRAUSE 2,679,270
SUPPORT FOR SCREW-REMOVING TOOLS
Filed Nov. 2, 1951
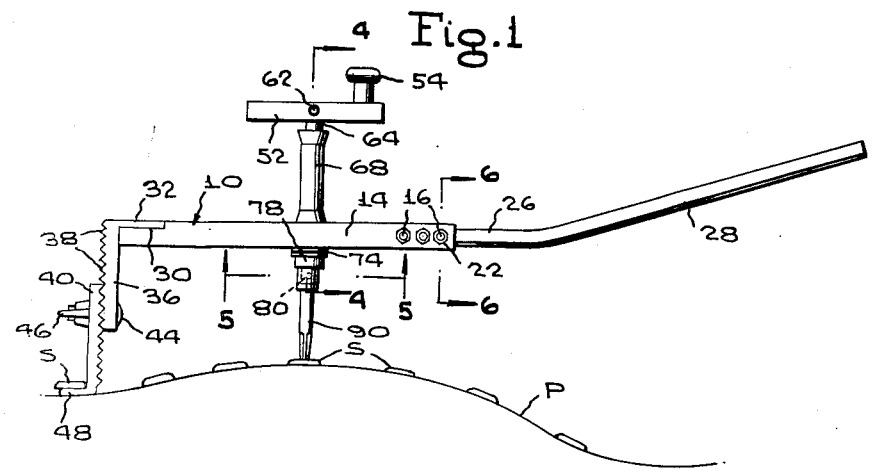
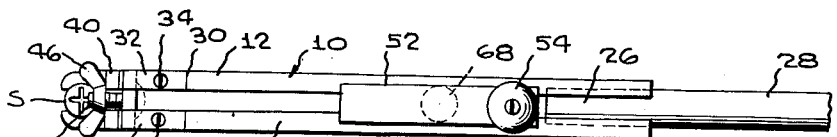
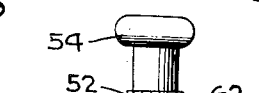
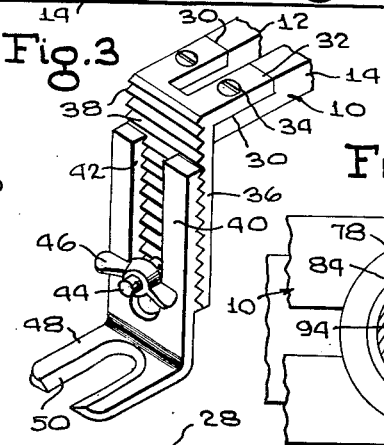
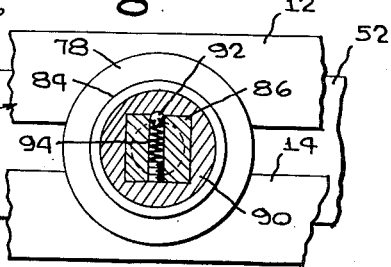
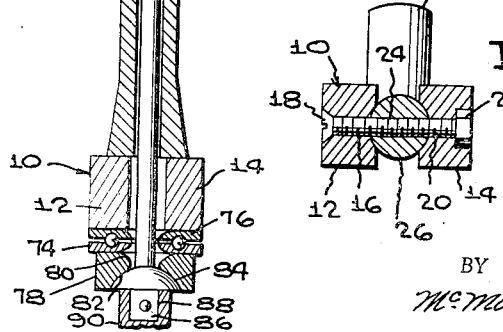
INVENTOR
PEARL E. KRAUSE
BY
McMorrow, Berman & Davidson
ATTORNEYS Patented May 25, 1954

2,679,270

UNITED STATES PATENT OFFICE 2,679,270

SUPPORT FOR SCREW-REMOVING TOOLS

Pearl E. Krause, Gary, S. Dak.

Application November 2, 1951, Serial No. 254,598

3 Claims. (Cl. 144—32)

This invention relates to an improved support for a screw-removing tool.

In present-day aircraft construction, wide use is made of screws of various types, to hold contiguous sheet members, such as wing panels, assembled with one another and with a suitable frame underlying and reinforcing the same. On a single panel, the number of screws used can run to a surprisingly high amount, in view of the common practice of arranging the screws in closely spaced relation, in a plurality of adjacent rows.

To lessen the drag which would otherwise be created on fast flying aircraft, the screws used are generally of the countersunk type, so that the heads of the screws will be flush with the surface of the panel through which they extend.

In this connection, it is well appreciated among those charged with the maintenance of such aircraft that screws of this type are particularly difficult to remove, due to their well known tendency to "freeze" to the member engaged thereby. As a result, an excessive number of man hours is required to effect the removal of a single panel for the performance of necessary maintenance upon the aircraft. This is due to the fact that the tools presently used to accomplish the removal of the screws are so designed as to require that an excessive amount of time be consumed during the removal of each screw.

It is accordingly, the main object of the present invention to provide an improved support for screw-removing tools, that will be adapted particularly to the removal of screws from the panels of aircraft, and which will be so formed as to accomplish said removal of the screws with a high degree of facility, and in far less time than is presently required.

Another important object is to provide a device of the type stated which will be particularly adapted for the removal of screws which are disposed at various angles to one another, such as would be the case, for example, where a row of screws extends along a curved surface such as is found at almost any location upon an aircraft.

Another important object is to provide a device of the character described above which will be effective to break loose, with speed and ease, screws which have "frozen" to their associated panels.

Still another important object is to provide a device of the type stated which can be manufactured at very low cost, considering the great benefits to be obtained from the use thereof, and which will be comprised of a minimum of parts, simply arranged in a compact, readily portable assembly.

Other objects will appear from the following description, the claims appended thereto, and from the annexed drawing, in which like reference characters designate like parts throughout the several views, and wherein:

Figure 1 is a side elevational view of a device in accordance with the present invention, the device being illustrated as it appears while being used to remove the screws from the surface of an aircraft wing;

Figure 2 is a top plan view;

Figure 3 is an enlarged, fragmentary perspective view illustrating the anchoring means utilized at one end of the device;

Figure 4 is a sectional view, on an enlarged scale, taken on line 4—4 of Figure 1;

Figure 5 is a sectional view, the scale being still further enlarged, taken on line 5—5 of Figure 1; and Figure 6 is a sectional view on an enlarged scale taken on line 6—6 of Figure 1.

Referring to the drawing in detail, the reference numeral 10 designates generally the body of the illustrated device. The body 10, in the preferred form of the device, comprises a pair of relatively elongated bars 12, 14, which may be formed of aluminum or other material having the desired qualities of strength and lightness.

The bars 12 and 14 are formed to the same length, and are arranged in side by side, parallel relationship as may be readily noted from Figure 2.

The bars 12 and 14 are rigidly connected at their opposite ends, in the spaced parallel relation referred to above. For the purpose of rigidly connecting the bars 12 and 14 at one end, and securing fixedly to the bars at the same time a lever handle, I form in the bar 12 (Figure 6) a plurality of closely spaced, transverse bores 16. These are spaced longitudinally of the bar 12, contiguous to said end of the bar, and are counterbored at the outer surfaces of the bar to receive the tapered heads of connecting screws 18. The screws 18 extend through the several bores 16, and are extended through transverse bores 20 formed in the bar 14, that are aligned with the several bores 16 transversely of the bars. The bores 16, 20 are of smooth walled formation, and the bores 20 are formed, at the outer surface of the bar 14, with non-circular communicating recesses receiving nuts 22. The nuts 22 are formed complementarily to said recesses, so as to be held against rotation when positioned therein.

The medial portions of the screw shanks extend through smooth walled transverse bores 24 spaced longitudinally of the inner end of a handle 26, having an elongated lever extension 28 disposed obliquely to the bars 12 and 14 (Figure 1).

At their other ends, the bars 12 and 14 are cut away, as at 30 (Figure 3), to form angular recesses receiving complementarily formed tongues 32, that are rigidly secured to the respective bars by screws 34 or equivalent fastening means.

The tongues 32 are integral or otherwise rigid with a depending support member 36, the tongues extending at right angles from said support member. The support member 36 extends downwardly from the adjacent ends of the bars 12 and 14, and has one of its faces formed with transversely disposed gripping teeth 38.

The support member 36 may be considered as a fixed support member, and cooperates with a movable support member 40, one face of which is provided with teeth complementary to the teeth 38. Thus, the support member 40 can be adjusted longitudinally of the member 36, and coacts with the member 36 to provide a support depending from one end of the body 10, and adjustable as to length, so as to space the body 10 selected distances above a surface in which a plurality of screws are engaged, and are to be removed.

Formed in the support member 40, and extended longitudinally thereof, is a slot 42, that opens upon the upper end of the member. A threaded stud 44 is welded or otherwise rigidly secured to the free end of the support member 36, and extends laterally therefrom through the slot 42. A wing nut 46 is threaded upon said stud, and bears against the opposite edges of the slot 42, so as to fixedly connect the members 36, 40 in selected positions of relative longitudinal adjustment.

Formed integrally upon the lower end of the support member 40, and extending laterally and outwardly therefrom, is a horizontal foot 48, having a slot 50, the opposite side edges of which may be and preferably are beveled as illustrated in Figure 3. The beveling of the side walls of the slot 50 is particularly beneficial in that it permits the foot 48 to be extended under screws having angularly disposed bottom faces, which screws are commonly used in airplane construction.

A crank handle 52 is provided, at one end, with a knob 54, which is rotatably mounted upon the crank handle. Referring to Figure 4, there is formed in the under side of the crank handle, medially between opposite ends of said handle, a bottom recess 56, receiving the upper end of an elongated, vertically disposed shaft 58. That portion of the shaft that extends into the recess 56 is provided with a flattened surface 60 engageable by a set screw 62 threaded through the side wall of the crank handle 52 into the slot 56. In this way, the crank handle and shaft are fixedly but detachably connected to one another, so as to rotate the shaft 58 responsive to rotation of said crank handle.

Integral with the medial portion of the crank handle 52 is a depending boss 64 through which the recess 56 opens, said boss 64 extending into the counterbore 66 formed in the upper end of a sleeve 68. The sleeve 68 is provided with an end-to-end bore 70, communicating with and arranged concentrically with the counterbore 66. The shaft 58 extends through and is spaced closely from the side wall of the bore.

A coil spring 72 surrounds the shaft 58, and abuts at opposite ends against the boss 64 and the bottom wall of the recess or counterbore 66 of the sleeve 68. The spring is held under compression within said counterbore, and tends to urge the shaft 58 upwardly within the sleeve 68.

The lower end portion of the shaft 58 projects beyond the lower end of the sleeve 68, through the space between the bars 12 and 14 (see Figure 4). That end of the shaft that extends downwardly below the bars 12 and 14 is projected through a ball bearing 74 the center opening of which may be provided with a sloping face 76 for a purpose to be made presently apparent.

One race of the ball bearing 74 bears against the under side of the body 10, while the other race of said bearing bears against the upper surface of a block 78 having a center opening, the medial portion of which is of a reduced diameter. Above said medial portion of the center opening of the block 78, said opening is flared, as at 80, while below said medial portion, the opening is also flared to provide a concaved recess 82 receiving an enlargement 84 integrally formed upon the shaft 58. The enlargement 84 is formed as a segment of a sphere, so as to be complementary to the spherically formed recess 82 of the block 78.

Formed integrally upon the shaft 58, and extending downwardly from the bottom face of the enlargement 84, is a non-circular extension 86, which is adapted to be disposed within a complementarily formed socket 88 of a screw driver bit 90. The bit 90 is adapted to be removed from the extension 86, and to this end, a spring loaded ball 92 (Figure 5) is provided within the depending extension 86 of the shaft 58, said ball being biased by its associated spring 94 into a ball receiving recess formed in the wall of the socket of the bit 90.

Obviously, any desired bit 90 can be connected to the extension 86, and the choice of a suitable bit will depend upon the particular type of screw S to be removed from a panel P.

The use of the device is illustrated in Figure 1. As a first step one of the screws S is loosened, so as to permit the foot 48 to be disposed thereunder to provide an anchor for one end of the device. Thereafter, the driving unit comprising the crank 52, shaft 58, sleeve 68, bit 90, and associated parts, is shifted longitudinally of the body 10 within the longitudinal slot defined by the spaced bars 12 and 14 of said body. When the working end of the bit 90 is disposed above a screw S to be removed, the user exerts pressure downwardly against the lever handle 28, so as to enter the bit into the kerf of the screw. The crank 52 is then rotated, in a direction to break the screw loose and thread the screw out of the panel P.

Without removing the device from the position illustrated in Figure 1, the user can, after removing one screw S, adjust the rotatable assembly longitudinally of the body 10 to the next screw in the row. In this way, one can travel along an entire row of screws, removing each in turn without disturbing the position of the stationary parts of the device. Obviously, the body 10 can, in this connection, be made of any suitable length.

In Figure 1, a row of screws S is illustrated wherein the several screws are related at different angles to one another, due to the curved surface of the panel P over which said row extends. Despite this formation of the panel, each screw S can be removed with facility, utilizing my device. This is so because the entire rotatable assembly mentioned above can be turned angularly to the vertical position thereof illustrated in Figure 1, so as to be disposed obliquely to the body 10. In other words, the rotatable portion of the device can be aligned coaxially with any screw to be removed, even though the axis of said screw may not be disposed perpendicularly to the horizontal body 10. The device is simply pivoted within the body 10, the longitudinal slot defined between the bars 12 and 14 of the body permitting any pivotal movement desired, in a plane disposed longitudinally and centrally of the body. In this connection, the ball bearing 74 will still remain in the position illustrated in Figures 1 and 4, in contact with the under side of the body 10, and the block 78 will remain in its same position, in contact with the bottom race of the ball bearing. However, the shaft 58 is now disposed obliquely to the body 10, the segmental enlargement 84 having universal movement within the spherical recess 82 of the block 78.

Considerable leverage is afforded by the construction illustrated and described, when it is desired to break loose a screw which has been "frozen" to its associated panel P, preliminary to unthreading of said screw. This leverage is exerted by grasping the crank handle 52, so as to rotate the shaft 58 and thus loosen the screw in the panel. Thereafter, if desired the user can grasp the knob 54 with one hand and remove his other hand from the lever extension 28 on which said other hand is ordinarily located. The hand removed from the lever extension 28 is then used for grasping the sleeve 68 to hold the shaft 58 perpendicular to the screw. The crank handle 52 is then rotated as necessary until the desired amount of the screw is removed.

As has been indicated hereinbefore, the device has particularly advantageous application to screws such as are extended into the panels of aircraft wings or other parts of an aircraft, so as to permit a selected panel to be removed in a minimum time, for the performance of necessary repair or maintenance work thereon or upon the plane on which the panel is mounted. Heretofore, it has required as much as eighteen and one-half man hours of labor, to remove a single aircraft wing panel. However, by actual count, the same panel has been removed in one and one-half hours, through the use of the device illustrated and described.

Of course, the device is usable not only for removing screws, but also for driving screws, and it is further worthy of note that the device can be used upon structures other than aircraft, if desired.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In combination, a horizontal body provided with a longitudinal slot, said body having upper and lower sides, a work engaging support depending from one end of said body and serving as a fulcrum, a sleeve having a lower end and an upper end, the lower end of the sleeve being slidably and supportably engaged with the upper side of said body, said sleeve having a vertical bore extending therethrough including an enlarged bore portion opening through the upper end of the sleeve and with said bore defining a shoulder spaced from the upper end of the sleeve, a shaft extending rotatably and freely through said bore and said enlarged bore portion, said shaft having an upper end portion rising above the upper end of said sleeve, shaft rotating means on said upper end portion of the shaft including a member rotatably and slidably fitting in said enlarged bore portion, a helical spring circumposed on the shaft and compressed between said member and said shoulder, said shaft having a lower end portion, said lower end portion being smaller in diameter than and extending downwardly through the slot of said horizontal body, a connector on the lower end of the shaft to which a screw removing tool is adapted to be connected, said connector being spaced below the under side of said body, and universal rotary bearing means circumposed on the shaft between said connector and the underside of the body, said bearing means having an element slidably engaged with the under side of said body for movement longitudinally and crosswise relative to said body.

2. In combination, a horizontal body provided with a longitudinal slot, said body having upper and lower sides, a work engaging support depending from one end of said body and serving as a fulcrum, a sleeve having a lower end and an upper end, the lower end of the sleeve being slidably and supportably engaged with the upper side of said body, said sleeve having a vertical bore extending therethrough including an enlarged bore portion opening through the upper end of the sleeve and with said bore defining a shoulder spaced from the upper end of the sleeve, a shaft extending rotatably and freely through said bore and said enlarged bore portion, said shaft having an upper end portion rising above the upper end of said sleeve, shaft rotating means on said upper end portion of the shaft including a member rotatably and slidably fitting in said enlarged bore portion, a helical spring circumposed on the shaft and compressed between said member and said shoulder, said shaft having a lower end portion, said lower end portion being smaller in diameter than and extending downwardly through the slot of said horizontal body, a connector on the lower end of the shaft to which a screw removing tool is adapted to be connected, said connector being spaced below the under side of said body, and universal rotary bearing means circumposed on the shaft between said connector and the underside of the body, said bearing means having an element slidably engaged with the under side of said body for movement longitudinally and crosswise relative to said body, said bearing means comprising a block having a central opening larger in diameter than the said lower end portion of the shaft and receiving the said lower end portion of the shaft, a convex surface on said connector, a concavity on said block turnably receiving said convex surface, and an annular bearing circumposed on said lower end portion of the shaft between the underside of the body and said block, said bearing being slidably engaged with the underside of the body and slidably engaged with said block.

3. In combination, a horizontal body provided with a longitudinal slot, said body having upper and lower sides, a work engaging support depending from one end of said body and serving as a fulcrum, a sleeve having a lower end and an upper end, the lower end of the sleeve being slidably and supportably engaged with the upper side of said body, said sleeve having a vertical bore extending therethrough including an enlarged bore portion opening through the upper end of the sleeve and with said bore defining a shoulder spaced from the upper end of the sleeve, a shaft extending rotatably and freely through said bore and said enlarged bore portion, said shaft having an upper end portion rising above the upper end of said sleeve, shaft rotating means on said upper end portion of the shaft including a member rotatably and slidably fitting in said enlarged bore portion, a helical spring circumposed on the shaft and compressed between said member and said shoulder, said shaft having a lower end portion, said lower end portion being smaller in diameter than and extending downwardly through the slot of said horizontal body, a connector on the lower end of the shaft to which a screw removing tool is adapted to be connected, said connector being spaced below the under side of said body, and universal rotary bearing means circumposed on the shaft between said connector and the underside of the body, said bearing means having an element slidably engaged with the underside of said body for movement longitudinally and crosswise relative to said body, said bearing means comprising a block having a central opening larger in diameter than the said lower end portion of the shaft and receiving the said lower end portion of the shaft, a convex surface on said connector, a concavity on said block turnably receiving said convex surface, and an annular bearing circumposed on said lower end portion of the shaft between the underside of the body and said block, said bearing being slidably engaged with the underside of the body and slidably engaged with said block, said annular bearing being a ball bearing having a race slidably engaging the underside of the said body and another race slidably engaging said block.

References Cited in the file of this patent

UNITED STATES PATENTS

| Number | Name | Date |
|---|---|---|
| 634,392 | Clowe | Oct. 3, 1899 |
| 735,251 | Harrison | Aug. 4, 1903 |
| 1,003,043 | Goughnour | Sept. 12, 1911 |
| 1,058,654 | Barber | Apr. 8, 1913 |
| 1,331,824 | Powers | Feb. 24, 1920 |
| 1,829,557 | Ewing | Oct. 27, 1931 |
| 1,865,284 | Smith | June 28, 1932 |
| 2,277,961 | Detmers | Mar. 31, 1942 |
| 2,491,727 | Gotting | Dec. 20, 1949 |
| 2,610,659 | Shaker | Sept. 16, 1952 |
| 2,623,556 | Henry | Dec. 30, 1952 |
| 2,626,641 | Martell | Jan. 27, 1953 |
| 2,632,486 | Fetsko | Mar. 24, 1953 |

FOREIGN PATENTS

| Number | Country | Date |
|---|---|---|
| 391,124 | Great Britain | Apr. 18, 1933 |